Jan. 7, 1930.    L. DE BROUCKERE ET AL    1,742,585
WEIGHING APPARATUS
Filed Nov. 14, 1927    2 Sheets-Sheet 1
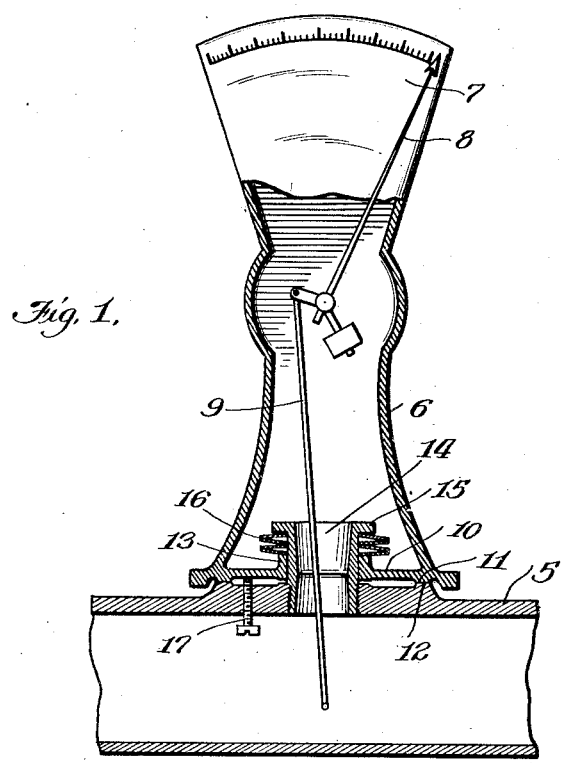
Fig. 1.
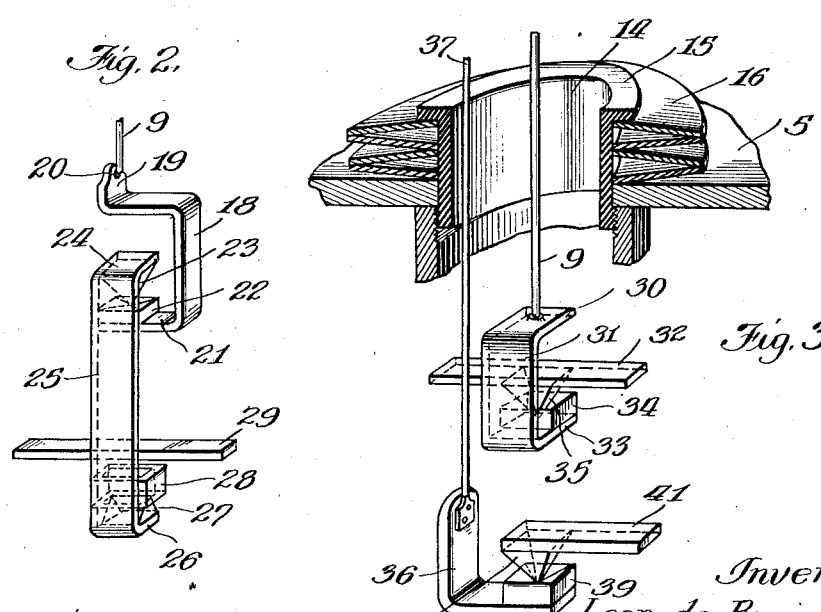
Fig. 2.
Fig. 3.
Inventors
Leon de Brouckere
Adrianus van Duyn
By Nissen & Crane
attys.

Jan. 7, 1930.  L. DE BROUCKERE ET AL  1,742,585
WEIGHING APPARATUS
Filed Nov. 14, 1927  2 Sheets-Sheet 2

Inventors
Leon de Brouckere
Adrianus van Duyn
By Nissen & Crane
Attys.

Patented Jan. 7, 1930

1,742,585

UNITED STATES PATENT OFFICE

LÉON DE BROUCKERE, OF FOREST-BRUXELLES, BELGIUM, AND ADRIANUS VAN DUYN, OF ROTTERDAM, NETHERLANDS, ASSIGNORS TO NAAMLOOZE VENNOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED-LIABILITY COMPANY OF THE NETHERLANDS

WEIGHING APPARATUS

Application filed November 14, 1927, Serial No. 232,990, and in Belgium November 18, 1926.

The present invention relates in general to weighing apparatus and has particular reference to that type of weighing apparatus in which the weighing mechanism is directly associated with a base structure and operatively connected with indicating mechanism which, in turn, is directly associated with a super-structure.

The primary object of the invention is to provide an arrangement and combination of parts which will permit rotation of the super-structure relatively of the base structure without in any way disturbing or interfering with the operative connection between the weighing mechanism and the indicating mechanism regardless of whether the weighing mechanism is loaded or unloaded.

With these and other objects in view the invention will be further described with reference to the accompanying drawings in which—

Fig. 1 is a sectional view in a vertical plane parallel to the front surface of the direct reading scale constructed in accordance with the present invention;

Fig. 2 is a detail view in perspective of one form of the rotatable connection between the weighing mechanism and the indicating mechanism;

Fig. 3 is a detail view in perspective of a modified form of rotatable connection between the indicating mechanism and the weighing mechanism;

Figure 4:
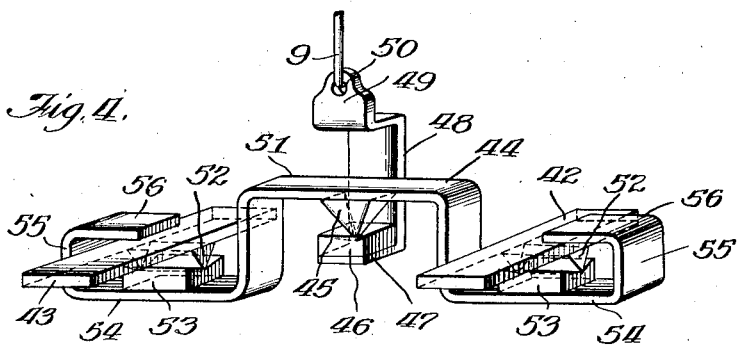
Fig. 4 is a perspective view in detail of still another form of the rotatable connection between the indicating mechanism and the weighing mechanism.

Referring now to the drawing in detail, 5 represents the base structure and 6 the super-structure. The base structure 5 is intended to house the weighing mechanism and the super-structure 6 is intended to house the indicating mechanism for the direct reading dial 7 across the face of which the pointer 8 is moved by the indicating mechanism in response to movement developed by the load on the weighing mechanism in the base structure 5. According to all forms of my invention, it is preferred to connect the indicating mechanism to the weighing mechanism through the medium of one or more connecting rods, such as 9, the same extending through an opening in the bottom of the super-structure 6 and the top of the base structure 5 and terminating at the point of connection with the weighing mechanism. This general arrangement is more or less common in weighing apparatus of the type selected for illustrating the application of the present invention but in these conventional constructions, the super-structure 6 is not mounted for rotation relatively of the base structure 5 so that the connection between the rod 9 and the weighing mechanism does not have to compensate for the rotation of the super-structure. In the present case, the super-structure is mounted for rotation relatively of the base 5 and as a result, the special connection between the connecting rod 9 and the weighing mechanism must be accounted for. To this end, we propose to pivot, so to speak, the rod 9 relatively of the weighing mechanism so that the rod and the indicating mechanism which it connects may rotate with the super-structure without in any way disturbing the operation and accuracy of the weighing mechanism regardless of whether the weighing mechanism is loaded or unloaded. Before describing this pivotal connection, we will first invite attention to the mounting of the super-structure upon the base 5. In this connection, the super-structure is provided with a bottom piece 10 formed preferably as an integral part of the structure and having an annular ring 11 around the bottom piece 10 which is intended to contact with a similar surface 12 on top of the base 5. The surfaces of the parts 11 and 12 are ground to a smooth even finish so that the super-structure may rotate with these surfaces providing a track, so to speak. Arranged centrally of the bottom 10 is an opening surrounded by an upstanding flange 13. This opening is made for the reception of the flanged sleeve 14 which is inserted through the opening and into a registering opening in the base 5 providing a tubular pivot. The opening in the base 5 is internally threaded for the external threads on the end of the sleeve 14. Confined between the upstanding flange 13 and the radial flange 15 on the sleeve 14 is a spring tension device 16. When the sleeve 14 is inserted in the openings and threaded in the opening in the base 5, it may be turned up or down to increase or decrease the tension of the spring 16. As a result, the friction between the surfaces 11 and 12 may be adjusted so that the super-structure 6 will freely rotate or rotate under more or less tension. In other words, the sleeve 14 becomes a means for adjusting the tension under which the super-structure rotates, and maintains the friction between the surfaces 11 and 12 even.

Since it will not be desirable to permit the super-structure 6 to rotate except within certain limits, the bottom 10 may be provided with a stop pin or the like positioned to contact with a similar pin 17 projecting up through the top of the base 5 and positioned so as to limit the rotation of the super-structure. It is of course understood that a series of these stops may be arranged to be adjusted into and out of contacting relation so that the super-structure may be rotated to various extents.

In most every instance, we will desire to connect the rod 9 with a stirrup as a part of the pivotal connection between the rod and the weighing mechanism. With this arrangement and referring particularly to Fig. 2, 18 represents such a stirrup and the same is made with an upstanding lug 19 having an opening 20 therethrough for the reception of the terminal of the rod 9. The stirrup is thus suspended by the rod within the housing 5 and the lower supporting ledge 21 thereof is equipped with a contact bearing block 22 for the knife point 23. The knife point 23 in turn is fixed to the turned end 24 of the upright strap 25. The opposite end of the strap 25 is turned parallel to the end 24 to provide a ledge 26 for supporting a knife point 27 which has an elongated bearing contact with the under side of a block 28 which, in turn, is provided with a similar contact on the top side for the reception of the knife point on the under side of the lever 29 of the weighing mechanism. With this construction, the knife point 23 and the block 22 provides a pivotal connection so that while the stirrup 18 may rotate, it does not disturb the position of the strap 25 and the parts of the mechanism supported by the lower end thereof. In other words, the stirrup 18 may rotate about the pivot with the super-structure 6, the rod, in this connection, extending through the tubular pivot 14 and out of contact therewith.

The connection shown in Fig. 3 involves the same principle so far as the pivot is concerned in that the rod 9 is connected to the end 30 of the stirrup 31 but the stirrup, in this instance, directly supports the lever 32 of the weighing mechanism in the absence of the strap 25. The lower supporting ledge 33 on the stirrup 31 carries a block 34 for the knife point 35 which is mounted on the under side of the lever 32.

Figure 5:
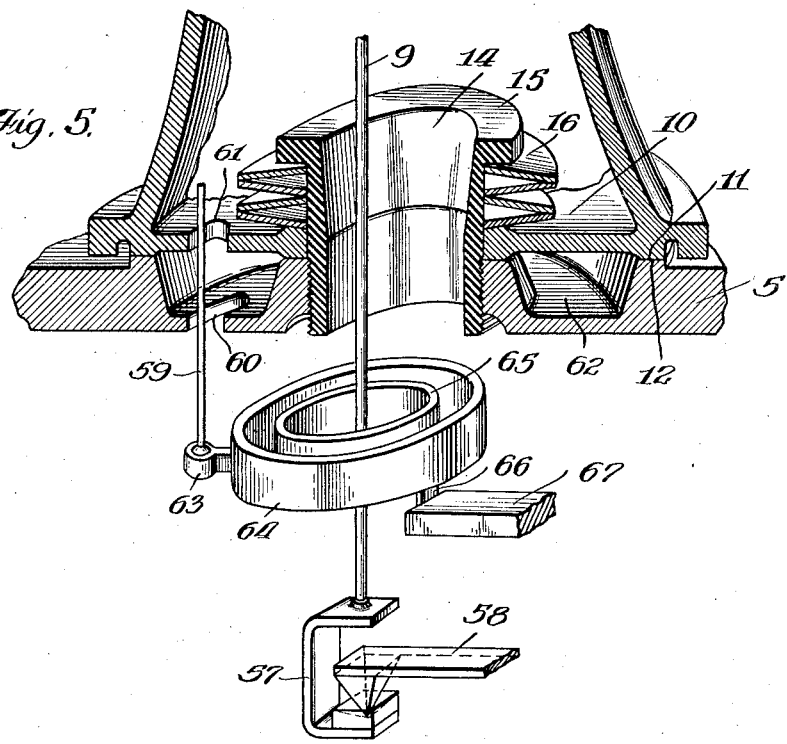
Fig. 5 is a perspective detail view of a further form of connection.

In the event that the weighing apparatus is equipped with more than one indicating means which functions in response to the weighing mechanism, and it becomes desirable to extend a connecting rod into the super-structure in addition to the rod 9, the same may be conveniently accomplished in either of the two ways illustrated in Figs. 3 and 5.

In Fig. 3, the arrangement comprises an L-shaped strap 36 to which the supplemental rod 37 is connected with the leg 38 of the L-shaped strap supporting the bearing block 39 for the knife point 40 which is mounted to the lever 41. For a dual arrangement of levers 42 and 43, it is proposed to provide a yoke-shaped support 44 having a knife point 45 intermediate the supporting ends of the levers 42 and 43 with this knife point contacting with a bearing block 46 which is supported by the ledge 47 of the stirrup 48. The opposite end of the stirrup is made with an upturned lug 49 having an opening 50 for the reception of the terminal of the rod 9. In this form, both levers 42 and 43 of the weighing mechanism are pivoted on the stirrup 48 so that the stirrup is free to move within the limits provided by the position of the horizontal part 51 of the lever support. Each of the levers 42 and 43 are provided with elongated knife points 52 which contact with elongated blocks 53 supported on the opposite extending ledges 54 of the support. The ends of the ledges 54 are turned upwardly as at 55 and then inwardly as at 56 to provide stops for the tilting movement of the levers 42 and 43.

As a second means for accommodating a supplemental connecting rod between the weighing mechanism and the indicating mechanism to provide for additional indications in the super-structure, attention is invited to Fig. 5 in which the rod 9, as in the other forms, extends through the tubular pivot 14 and is connected to the stirrup 57 for the lever 58 for the same purpose as described with reference to the other forms. The supplemental or auxiliary rod 59, instead of extending through the tubular pivot 14, projects through registering slots 60 and 61 in the top of the base structure 5 and the bottom 10 of the super-structure respectively. These slots are curved so as to allow for the rotation of the super-structure without fouling the rod and also to prevent the rod from fouling the slot 60 in the top of the base 5. The top of the base 5, in this particular form, is made with a relatively deep countersink 62 immediately below the bottom 10.

The lower extremity of the rod 59 is connected to an ear 63 projecting from the side of the outer ring part 64 of a ball bearing race assembly. The inner ring 65 of the ball bearing assembly has a downwardly projecting hanger 66 for connecting the lever 67 of the weighing mechanism. The rod 9 extends through the inner ring 65 of the ball bearing, as shown.

Figure 6:
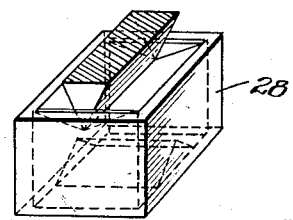
Fig. 6 is a perspective detail view for the connection illustrated in Fig. 2.

In Fig. 6, we have illustrated in detail, the contact block 28 for the knife point of the lever 29 shown in Fig. 2. The contact point in the bottom of this block 28 is arranged transversely of the contact in the top thereof so as to permit the lever 29 to rock both endwise and sidewise.

In all forms of the arrangement, the connection between the rod 9 and the stirrup suspended thereby becomes a center pivot, so to speak, and in most cases, it will be located concentric with the axis of rotation of the super-structure. The blocks such as 22, 28, 34, 39, etc., may be made from agate or some other suitably hard substance that will accurately perform its intended function of providing a balanced contact point for the levers.

The rotation of the super-structure also makes it possible to use one water level only for placing the entire mechanism in true horizontal weighing position. When the centering point is fixed, not to a transverse element, but to a lever, the legal provisions of certain countries demand the use of a knife edge on the lever for connecting the center point to said lever. This accounts for the construction illustrated in Fig. 2, where the lever has a single arm, and the construction shown in Fig. 3, where the lever has two arms.

The arrangement and co-operative relationship of the parts above referred to are suitable not only to weighing apparatus for direct reading but they are also adaptable to analogous weighing apparatus regardless of what type of mechanism is located in the base and what type of indicating mechanism is used in the super-structure.

Obviously those skilled in the art may make various changes in the combination and arrangement of parts without departing from the spirit and scope of the invention as defined by the appended claims, and we wish therefore not to be restricted to the precise construction herein described.

We claim:—

1. A weighing apparatus having a base structure and a superstructure, a tubular pivot rotatably mounting the superstructure upon the base structure, weighing mechanism in the base structure, indicating mechanism in the superstructure, and a rod passing through said tubular pivot connecting the weighing mechanism with the indicating mechanism, said weighing mechanism embody in its construction a plurality of levers laterally pivoted relatively of said rod.

2. A weighing apparatus having a base structure and a superstructure, a tubular pivot rotatably mounting the superstructure upon the base structure in frictional contact therewith, and a spring tension device associated with said tubular pivot for adjusting said contact.

3. A weighing apparatus having a base structure and a superstructure, a tubular pivot rotatably mounting the superstructure upon the base structure, annular contacting surfaces upon the super and base structures, and a spring tension device associated with said tubular pivot for adjusting the friction between said surfaces and maintaining the contact between the same constant.

4. A weighing apparatus having a base structure and a superstructure, a tubular pivot rotatably mounting the superstructure upon the base structure, annular contacting surfaces upon the super and base structures, and a spring tension device associated with said tubular pivot for adjusting the friction between said surfaces and maintaining the contact between the same constant, said tubular pivot comprising a sleeve extending through an opening in the bottom of the superstructure and having a threaded engagement with a registering opening in the top of the base structure.

5. A weighing apparatus having a base structure and a superstructure, a tubular pivot rotatably mounting the superstructure upon the base structure, annular contacting surfaces upon the super and base structures, and a spring tension device associated with said tubular pivot for adjusting the friction between said surfaces and maintaining the contact between the same constant, said tubular pivot comprising a sleeve extending through an opening in the bottom of the superstructure and having a threaded engagement with a registering opening in the top of the base structure, and said spring tension device comprising a series of spring washers encircling the upper part of said sleeve and confined under tension thereon between the bottom of the superstructure and an annular flange on top of the sleeve.

6. A weighing apparatus as set forth in claim 3 and in which weighing mechanism is housed in the base structure with indicating mechanism in the superstructure connected thereto by a rod passing through said tubular pivot.

7. A weighing apparatus having a base structure and a superstructure, a tubular pivot rotatably mounting the superstructure upon the base structure, weighing mechanism in the base structure, indicating mechanism in the superstructure connected to the weighing mechanism by a rod passing through said tubular pivot, a lateral pivotal connection between said rod and a lever of the weighing mechanism, and a knife edge pivoted connection between said lever and other parts of the weighing mechanism.

8. A weighing apparatus having a base structure and a superstructure, a pivotal connection mounting the superstructure for rotation upon the base structure, weighing mechanism in the base structure, indicating mechanism in the superstructure, and means rotatable with the superstructure connecting said mechanism and comprising a rod connected at one end to the indicating mechanism and having its opposite end pivoted for lateral movement relatively of the weighing mechanism, a second rod connected at one end to the indicating mechanism, a ball bearing assembly, said second rod having its opposite end connected to one part of a ball bearing assembly, and a lever in a weighing mechanism connected to another part of said ball bearing assembly.

9. A weighing apparatus having a base structure and a superstructure, a pivotal connection mounting the superstructure for rotation upon the base structure, weighing mechanism in the base structure, indicating mechanism in the superstructure, and means rotatable with the superstructure connecting said mechanism comprising a rod connected at one end to the indicating mechanism, and means pivoting the opposite end of said rod to the weighing mechanism for lateral swinging movement relatively thereof, comprising a stirrup-like member suspended by the rod, a pivot bearing on said stirrup, a bearing point for said pivot bearing, and means for mounting the levers of the weighing mechanism on said bearing point, comprising a yoke-like member having lever supporting ends at opposite sides of said bearing point and knife edge connections between the weighing mechanism levers and the supporting ends of said yoke-like member.

In testimony whereof, I, LÉON DE BROUCKERE, have signed my name to this specification on this 25th day of October, 1927.

LÉON DE BROUCKERE.

In testimony whereof, I, ADRIANUS VAN DUYN, have signed my name to this specification on this 27th day of October, 1927.

ADRIANUS VAN DUYN.